Sept. 21, 1948. P. T. WAK, JR., ET AL 2,449,680
VEHICLE TOW BAR
Filed Jan. 31, 1947

INVENTORS.
Peter T. Wak, Jr.
Arthur J. Carpenter
BY
J. S. Murray
ATTORNEY

Patented Sept. 21, 1948

2,449,680

UNITED STATES PATENT OFFICE 2,449,680

VEHICLE TOW BAR

Peter T. Wak, Jr., and Arthur J. Carpenter,
Lake Orion, Mich.

Application January 31, 1947, Serial No. 725,548

2 Claims. (Cl. 280—47)

This invention relates to vehicle tow bars and particularly tow bars for handling aircraft.

There have been developed tow bars employing a pair of spaced arms and a provision for varying the spaced relation of such arms so that they may engage or disengage a tail wheel of an aeroplane. Such developments have been rendered unduly heavy and expensive by mechanism employed to regulate spacing of the arms. It is highly desirable that such tow bars be of simple, light and inexpensive construction, so that they may be carried about a landing field or hangar without being burdensome and so that their cost will be low enough that any plane owner may easily afford them.

An object of the invention is to provide a vehicle tow bar of the spaced arm type having the spacing of the arms controlled by a very simple mechanism such as minimizes the weight and cost of such bar.

Another object is to provide spring means biasing the arms toward their minimum spacing, so as to maintain a towing position of the arms, when once established.

Another object is to regulate the spacing of the two bar arms by a sliding sleeve on the handle of such bar, and to provide a spring connection from such sleeve to a pivotal one of the arms to bias such arm toward the companion arm.

These and various other objects are attained by the construction hereinafter described and illustrated in the accompanying drawing, wherein.

Figure 1:
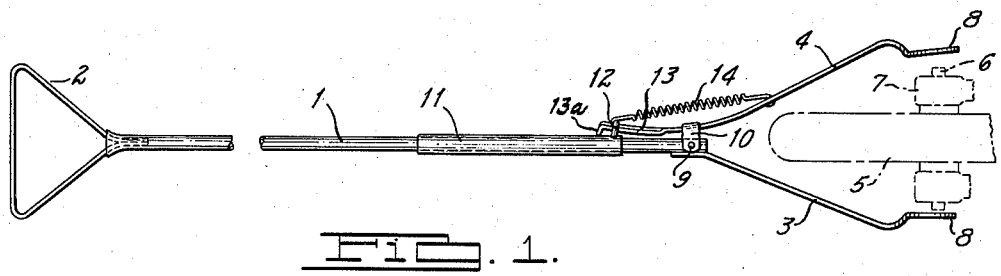
Fig. 1 is a top plan view of our improved tow bar with its attaching arms expanded.
Figure 2:
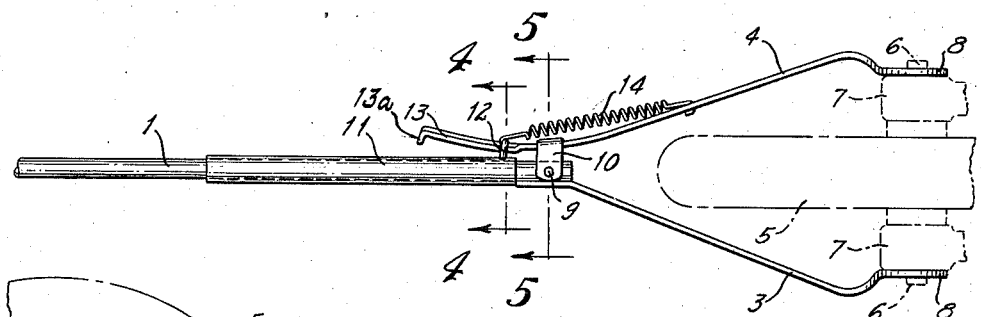
Fig. 2 is a similar view with said arms in towing position.
Figure 3:
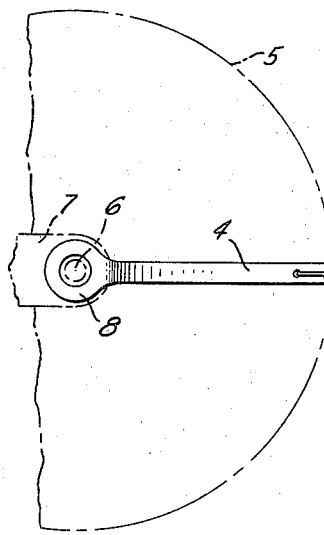
Fig. 3 is a side elevational view of the same.
Figure 5:
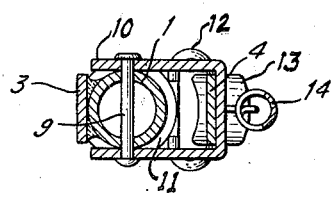
Figure 4:
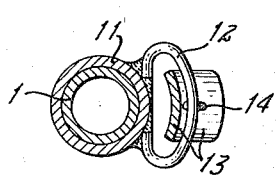

Figs. 4 and 5 are cross sectional details, taken respectively on the lines 4—4 and 5—5 of Fig. 2.

In these views, the reference character I designates an elongated handle member which is preferably tubular, and rigidly carries at one of its ends a looped element 2, preferably of triangular form, and serving as a hand grip. The other end of the handle I mounts a pair of divergent arms 3 and 4, having their free end portions spaced to straddle the tail wheel 5 of an aeroplane. Said wheel has its axle 6 projecting terminally at least slightly beyond the forks 7 mounting such axle and the free ends of the arms 3 and 4 are enlarged and apertured as indicated at 8 to engage the axle extremities. The arm 3 is welded or otherwise rigidly secured to the handle I, and the arm 4 is pivoted on the handle by a pin 9 engaged by a pair of lugs 10 fixed on such arm and straddling the handle. Slidable on the handle near its end carrying said arms is a sleeve II rigidly carrying a loop 12 which may be formed of wire. The arm 4 has an extension 13 from its pivotal end inserted freely in said loop and diverging from the sleeve. The arrangement is such that sliding actuation of the sleeve to a limiting position adjacent the pivot pin 9 serves to swing the arm 4 predeterminedly toward the arm 3, while a reverse sliding of the sleeve effects a maximum spacing of the two arms. To avoid any accidental escape of the arms from towing engagement with an aircraft, it is desirable to resist any shifting of the sleeve II from its position minimizing the spaced relation of the arms. Thus a coiled spring 14 is extended from the arm 4 to the sliding sleeve and preferably to the loop 12, such spring biasing the sleeve to its position shown in Fig. 2. It is evident that in such position the sleeve, through its loop 12, positively resists any outward swinging of the arm 4. Also it is clear that in any released position, the sleeve will be spring-shifted to its limiting position adjacent the arms. It is preferred to prevent disengagement of the extension 13 from loop 12 by forming a bend 13a on the free end of such extension.

In addition to its lightness and simplicity the described tow bar has the advantage that its control sleeve is located sufficiently forward on the handle I that the hand gripping such sleeve easily controls the position of the bar, so that the apertured ends 8 of the arms are easily registered with extremities of the axle.

What we claim is:

1. A vehicle tow bar comprising an elongated handle, a pair of arms extending from an end of said handle and having spaced vehicle-engaging portions, at least one of said arms being pivoted to swing to and from the other arm to engage the arms with and disengage them from a vehicle, a member slidable on the handle, a control element for the pivotal arm projecting from the pivotal end of such arm, means on said sliding member for camming said element away from the handle responsive to sliding of said member toward the arms, whereby the pivotal arm is swung toward the companion arm, and a coiled spring extending from the pivotal arm to the sliding member and urging the sliding member along the handle toward the arms.

2. A vehicle tow bar as set forth in claim 1, said sliding member being a sleeve embracing the handle.

PETER T. WAK, Jr.
ARTHUR J. CARPENTER.

REFERENCES CITED

The following references are of record in the file of this patent:

UNITED STATES PATENTS

| Number | Name | Date |
|---|---|---|
| 2,273,861 | Green | Feb. 24, 1942 |
| 2,313,599 | Surges | Mar. 9, 1943 |
| 2,348,741 | Jessen | May 16, 1944 |
| 2,391,608 | Wood | Dec. 25, 1945 |